(12) United States Patent
Stephenson et al.

(10) Patent No.: US 7,229,663 B2
(45) Date of Patent: *Jun. 12, 2007

(54) DISPLAY COMPRISING A CHOLESTERIC LIQUID-CRYSTAL IN HARDENED GELATIN AND METHOD FOR MAKING THE SAME

(75) Inventors: Stanley W. Stephenson, Spencerport, NY (US); Charles M. Rankin, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 604 days.

This patent is subject to a terminal disclaimer.

(21) Appl. No.: 10/619,329

(22) Filed: Jul. 14, 2003

(65) Prior Publication Data

US 2005/0013976 A1    Jan. 20, 2005

(51) Int. Cl.
*B05D 5/06*    (2006.01)

(52) U.S. Cl. ............... 427/162; 427/163.3; 427/163.4; 427/372.2; 427/64

(58) Field of Classification Search ............... 427/162, 427/163.3, 163.4, 372.2, 64
See application file for complete search history.

(56) References Cited

U.S. PATENT DOCUMENTS

| | | | |
|---|---|---|---|
| 3,171,721 A | * | 3/1965 | Strathearn et al. .......... 422/133 |
| 3,578,844 A | * | 5/1971 | Churchill et al. ............. 349/21 |
| 3,585,381 A | * | 6/1971 | Hodson et al. ................ 349/21 |
| 3,600,060 A | * | 8/1971 | Churchill et al. ............. 349/21 |
| 4,579,423 A | * | 4/1986 | Fergason ..................... 349/86 |
| 6,037,058 A | * | 3/2000 | Clikeman et al. ......... 428/402.2 |
| 6,061,107 A | | 5/2000 | Yang et al. |
| 6,280,915 B1 | * | 8/2001 | Van den Zegel et al. ... 430/502 |
| 2005/0084801 A1 | * | 4/2005 | El-Hafidi et al. ........ 430/289.1 |

FOREIGN PATENT DOCUMENTS

EP    1 116771 A2    7/2001

\* cited by examiner

*Primary Examiner*—Alain L. Bashore
(74) *Attorney, Agent, or Firm*—Carol F. Ruoff (57) ABSTRACT

A method of making a liquid-crystal sheet material, useful for displays, having polymer-dispersed cholesteric liquid crystals, comprising the steps of providing a emulsion comprising dispersed cholesteric liquid crystal domain and a solution comprising gelatin and a hardening agent, coating said emulsion onto a substrate; and drying said emulsion to form polymer-dispersed liquid-crystal domains dispersed in a continuous matrix comprising hardened gelatin. The invention is also directed to a display having an imaging layer comprising domains of polymer-dispersed cholesteric liquid-crystal material dispersed in a continuous matrix comprising hardened gelatin, said imaging layer disposed between first and second conductors. The invention is advantageous in reducing sensitivity to temperature and/or high humidity, especially in thin displays or displays that are open to the environment.

27 Claims, 2 Drawing Sheets

PLANAR

FIG. 3A

FOCAL-CONIC

FIG. 3B

DISPLAY COMPRISING A CHOLESTERIC LIQUID-CRYSTAL IN HARDENED GELATIN AND METHOD FOR MAKING THE SAME

FIELD OF THE INVENTION

The present invention relates to polymer dispersed cholesteric liquid crystal materials.

BACKGROUND OF THE INVENTION

Currently, information is displayed on sheets using permanent inks or displayed on electronically modulated surfaces such as cathode ray displays or liquid crystal displays. Other sheet materials can carry magnetically writable areas to carry ticketing or financial information. Magnetically written data, however, is not visible.

World patent application PCT/WO 97/04398, entitled "Electronic Book With Multiple Display Pages", is a thorough recitation of the art of thin, electronically written sheet display technologies. Disclosed is the assembling of multiple display sheets that are bound into a "book", each sheet provided with means to individually address each page. The patent recites prior art in forming thin, electronically written pages, including flexible sheets; image modulating material formed from a bi-stable liquid crystal system, and thin metallic conductor lines on each page.

An early patent, U.S. Pat. No. 3,578,844, discloses a light modulating structure suitable for a display device. In the patent, cholesteric liquid crystal material is encapsulated by light penetrable gelatin and gum arabic capsules that are coated on a screen. The capsules were formed by emulsifying the cholesteric material in a gelatin solution using a blender to form droplets between 10 and 30 microns in diameter. The pH of the emulsion was changed to precipitate a gelatin coating over each droplet of cholesteric material. The gelatin was hardened and the capsules sieved from the solution. The capsules are then coated over a field-carrying surface to provide an electrically switchable image.

U.S. Pat. No. 3,600,060 to Churchill et al. discloses another process for providing cholesteric liquid crystals in a polymer matrix. The patent discloses emulsifying droplets of liquid crystal in a solution having a dissolved film-forming polymer. The patent further discloses coatings or films having droplets of cholesteric liquid crystal material between 1 and 50 microns in diameter. Suitable binders mentioned in the paper include gelatin, gum arabic, and other water-soluble polymers. Churchill et al. disclose the emulsion can be coated on a substrate, e.g., by means of a draw down applicator to a wet thickness of about 10 mils and air dried at about 25° C. Churchill et al. state that the layers can be dried to touch. In Example 6, 60 grams of cholesteric liquid crystal material is disposed in 100 cubic centimeters of an aqueous polymer solution, polyvinyl alcohol or gelatin, and heated in a Waring® blender to 70° C. by a heating jacket to form a desired emulsion, after which the emulsions were coated onto glass previously coated with tin oxide. No hardening agent is used by Churchill et al. Such coatings would be sensitive to environmental conditions.

U.S. Pat. No. 5,168,380 discloses the generation of spherical encapsulated nematic liquid crystal using a hardening agent to strengthen the containment medium. The nematic liquid crystal and dye mixture must be encapsulated to separate different chemistries in a multi-color display. A first material, a maleic anhydride derived copolymer is in solution with the liquid crystal, while a second material, polyvinyl alcohol is in solution with the water bath holding liquid-crystal domains. Incubation for one hour allowed a cross-linking reaction to occur at the interface boundary to form a robust encapsulating wall. Capsules are formed with different color nematic liquid-crystal-and-dye mixtures that are coated to form multi-color displays. The nematic materials do not retain an image. The process requires a significant incubation time to form the walls. It would be advantageous to create polymer-dispersed liquid-crystal domains without the encapsulation step.

Another technique for providing liquid crystal domains in a coating is disclosed in U.S. Pat. No. 4,673,255. A resin polymer is dissolved into a liquid crystal. The resulting solution is induced into a cavity between two conductors. The resin polymer phase separated from the liquid crystal to form microdroplets of the liquid crystal in a polymeric matrix. The phase separation can be thermally induced, solvent induced or polymerization induced to create domains of liquid crystal. These processes, however, require lengthy periods of time to polymerize and phase separate the polymer binder. Organic solvents used in such systems are of environmental concern and are sensitive to processing conditions.

In view of the above, the prior art discloses cholesteric material encapsulated using pH changes to precipitate gelatin capsule walls around cholesteric droplets. No hardening agents are used in the process. The prior art also discloses aqueous-coated nematic liquid crystals having a cross-linking agent. The resulting coatings do not have the property of memory. Phase separation systems for cholesterics disclose cross-linking agents in solution with cholesteric liquid crystal material. The cross-linking agent permits polymerization of the monomer to form a polymer-dispersed cholesteric layer. Such processes are slow.

The patents mentioning gelatin for use in a liquid-crystal display do not employ a gelatin hardener in a continuous binder matrix. Although hardened gelatin is used in photographs to harden the material, the need is not the same in liquid crystal displays in which the gelatin is typically protected by several layers of material including a plastic or glass substrate. Typically, liquid-crystal material is wicked between plates of glass. Furthermore, unless necessary, a gelatin hardener can be problematic for coating a gelatin material and may require more difficult manufacture.

PROBLEM TO BE SOLVED BY THE INVENTION

It has been unexpectedly found that aqueous-coated polymer-dispersed liquid-crystal materials can be sensitive to moisture and temperature, particularly at elevated temperatures. Cholesteric material dispersed in a gelatin layer is particularly sensitive to temperature and/or high humidity in thin displays or displays that are open to the environment. It would be advantageous to provide a display comprising an aqueous-coated polymer-dispersed liquid-crystal material that maintains its properties under various environmental conditions.

SUMMARY OF THE INVENTION

Accordingly, the problem is solved according to the present invention by providing a method of making a liquid-crystal sheet material, useful for displays (and manufactured intermediates thereof), having polymer-dispersed cholesteric liquid crystals in an electro-optical imaging layer, the method comprising the steps of (a) providing a emulsion comprising cholesteric liquid crystal domains dispersed in a solution comprising gelatin and a hardening agent; (b) coating said emulsion onto a substrate; and (c) drying said emulsion to form polymer-dispersed liquid-crystal domains dispersed in a continuous matrix comprising hardened gelatin.

The invention is also directed to a display comprising: (a) a flexible transparent support; (b) a patterned first conductor layer comprising transparent first conductors; (c) a patterned second conductor layer comprising second optionally transparent conductors; and (d) an imaging layer comprising domains of polymer-dispersed cholesteric liquid-crystal material dispersed in a continuous matrix comprising hardened gelatin, said imaging layer disposed between the first and second conductors.

In a particularly preferred embodiment, the imaging layer is less than 15 micrometers thick and spaced between sheet materials open at the side. The invention is especially useful in labels such as disclosed in U.S. Ser. No. 10/162,326 filed Jun. 4, 2002, in which the imaging layer is sandwiched between layers in a multilayer composite display sheet in which the imaging layer is open on the sides.

DETAILED DESCRIPTION OF THE INVENTION

Figure 1:
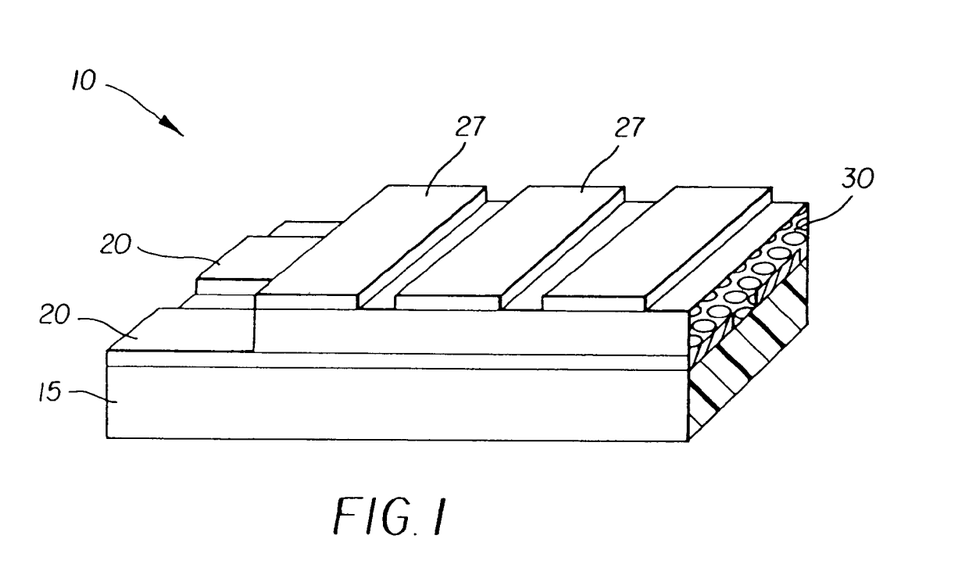
FIG. 1 is a partial perspective of a cholesteric liquid crystal display made in accordance with the present invention.

FIG. 1 is a partial perspective of one embodiment of a sheet 10 made in accordance with the invention. Sheets made in accordance with the present invention have particular applicability when used in displays. Sheet 10 includes a flexible substrate 15, which is a thin transparent polymeric material, such as Kodak ESTAR film base formed of polyester plastic that has a thickness of between 20 and 200 microns. In an exemplary embodiment, substrate 15 can be a 125-micron thick sheet of polyester film base. Other polymers, such as transparent polycarbonate, can also be used. The term substrate, as used in this disclosure, means a structure having one or more layers which receives polymer dispersed liquid crystals.

In the embodiment of FIG. 1, first conductors 20 are formed over substrate 15. Typically, first conductors 20 can be transparent tin-oxide or indium-tin-oxide (ITO), with ITO being the preferred material. Typically the material of first conductors 20 is sputtered as a layer over substrate 15 having a resistance of less than 1000 ohms per square. Transparent first conductors 20 can also be formed by printing a transparent organic conductor such as PEDT/PSS, PEDOT/PSS polymer, which materials are sold as Baytron® P by Bayer AG Electronic Chemicals. The layer is then patterned to form first conductors 20 in any well-known manner. Alternatively, first conductors 20 can be an opaque electrical conductor material such as copper, aluminum or nickel. If first conductors 20 are opaque metal, the metal can be a metal oxide to provide light absorbing first conductors 20. First conductors 20 are formed in the conductive layer by conventional lithographic or laser etching means. Typically the material of first conductors 20 is sputtered or coated as a layer over display substrate 15 having a resistance of less than 1000 ohms per square.

A polymer dispersed cholesteric layer 30 overlays first conductors 20. Polymer dispersed cholesteric layer 30 includes a polymeric dispersed cholesteric liquid crystal material, such as those disclosed in U.S. Pat. No. 5,695,682, the disclosure of which is incorporated by reference. Application of electrical fields of various intensity and duration can drive a chiral nematic material (cholesteric) into a reflective state, to a transmissive state, or an intermediate state. These materials have the advantage of maintaining a given state indefinitely after the field is removed. Cholesteric liquid crystal materials can be MERCK BL112, BL118 or BL126, available from E.M. Industries of Hawthorne, N.Y.

In the preferred embodiment, polymer dispersed cholesteric layer 30 is E.M. Industries' cholesteric material BL-118 dispersed in deionized photographic gelatin to form an emulsion. Useful "gelatins" as that term is used herein include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The emulsion can be dueled with an aqueous hardener solution to create a material resistant to humidity and temperature variations when used the display. The addition of a bacteriostat prevents gelatin degradation during emulsion storage and during material operation. The gelatin concentration in the emulsion when coated is preferably between about 2 and 20 weight percent based on the weight of the emulsion. In the final emulsion, in this embodiment, the liquid crystal material is dispersed at 8% concentration in a 5% deionized gelatin aqueous solution. The mixture is dispersed to provide domains having an average diameter of 2 to 30 microns, preferably 5 to 15 microns, more preferably about 10-microns, which domains of liquid crystal are dispersed in an aqueous suspension. (These size ranges also apply to the dried coating.) The material is coated over patterned ITO first conductors 20 to provide a polymer dispersed cholesteric coating having a dried thickness of less than 50 microns, preferably less than 25 microns, more preferably less than 15 microns, most preferably less than about 10 microns. Other organic binders such as polyvinyl alcohol (PVA) or polyethylene oxide (PEO) can be used as a binder in addition to gelatin. Such compounds are preferably machine coatable on equipment associated with photographic films. A conventional surfactant can be added to the emulsion to improve adhesion to first conductors 20. Surfactants can be of conventional design, and are provided at a concentration that corresponds to the critical micelle concentration (CMC) of the solution. A preferred surfactant is a mixture of the sodium salts of di-isopropyl and tri-isopropyl naphthalene sulfonate, commercially available from DuPont, Inc. (Wilmington, Del.) as ALKANOL XC surfactant.

In one embodiment, a liquid crystal material is dispersed in an aqueous bath containing a water-soluble binder material by the methods disclosed in coassigned EP 1 116 771 A2, hereby incorporated by reference in its entirety. The liquid crystal and gelatin emulsion are coated to achieve a dry thickness of between 5 and 30 microns to optimize the optical properties of the light-modulating layer. The coating thickness, size of the liquid crystal domains, and concentration of the domains of liquid crystal materials can be designed for optimum optical properties. The dispersion of liquid crystals can be performed using shear mills or other mechanical separating means to form domains of liquid crystal within the light-modulating layer. By varying the formulation, homogenization devices (sonification and rotor-stator mixer) produce emulsions of different droplet size.

In the invention, a hardening agent is added to the dispersion at the time of coating. Various hardening agents may be employed in the practice of this invention. In the context of this invention, hardeners are defined as any additive which causes chemical cross-linking in gelatin or gelatin derivatives. Preferably, a first solution contains dispersed cholesteric liquid crystal domains in a gelatin solution. The concentration of the gelatin and liquid crystal is higher than the coated concentration. A second solution contains a cross-linking agent, also known as a hardener. Liquid crystal emulsions without hardener can be stored for long periods of time without a cross-linking agent. The two solutions are mixed at the time of coating to initiate the cross-linking reaction. In one embodiment, the two solutions are pumped at rates that provide the desired coating concentrations. The two solutions are blended using a static mixer, which uses the velocity of a solution to turbulently mix components within the solution. Using conventional film coating machinery, the mixed solution can be immediately deposited onto a substrate. In practice, the time between the mixing and deposition is short enough that little cross-linking has occurred at the time of deposition. The mixed solution has a lower viscosity than after cross-linking, permitting good coating.

In another embodiment, the two solutions are not mixed, but are applied as two separate coatings. The two coatings can be deposited as two separate events or using a coating hopper that uses applies the two solutions as stacked layers. The two solutions can be deposited simultaneously, and the hardener is permitted to diffuse into the gelatin bearing layer.

Gelatin crosslinking agents (i.e., the hardener) are suitably included in an amount of at least about 0.01 wt. % and preferably from about 0.1 to about 10 wt. % based on the weight of the solid dried gelatin material used (by dried gelatin is meant substantially dry gelatin at ambient conditions as for example obtained from Eastman Gel Co., as compared to swollen gelatin), and more preferably in the amount of from about 1 to about 5 percent by weight. More than one gelatin crosslinking agent can be used if desired.

The weight percent of the mixed solution provides a low viscosity, typically below 30 centipoise viscosity when the solution is heated to a temperature between 30 and 50 degrees centigrade. The viscosity of such a gelatin solution is high, above 200 centipoise, when chilled to a temperature between 0 and 20 degrees centigrade. As mentioned above, common surfactants can be added at a concentration equal to the critical micelle concentration to make the emulsion coat evenly during the coating process.

In order to robustly coat this emulsion, the weight percent solution used in this invention provides a low viscosity, typically below 30 centipoise viscosity when the solution is heated to a temperature between 30 and 50 degrees centigrade. After coating, the layer is generally dried by simple evaporation, which may be accelerated by known techniques such as convection heating or impingement of forced air, at a temperature and rate that will not soften the emulsion at any given water concentration of the drying emulsion. Known coating and drying methods are described in further detail in *Research Disclosure* No. 308119, Published December 1989, pages 1007 to 1008. The coating is preferably dried by the impingement of air at a temperature and humidity that maintains the high viscosity of the gel state of the dispersing phase, thereby preventing remelting of the gelatin matrix and softening of the gelatin such that damage to the coating occurs. The coating is maintained below the melt temperature during drying. The melt temperature is the temperature at which the set coating will turn back into liquid form. If remelt occurs, air flow within the dryer can disturb the coating and, in severe cases of remelt, the coating liquid can trackoff within the machine, requiring the machine to be shutdown for cleaning. A method of coating a polymer-dispersed liquid-crystal material is disclosed in commonly assigned copending U.S. Ser. No. 10/095,379 entitled "A METHOD OF MAKING A COATED POLYMER-DISPERSED ELECTRO-OPTICAL FLUID AND SHEETS FORMED THEREBY" filed 2 Mar. 2002.

In one embodiment, the emulsion for the imaging layer was coated by (i) heating the emulsion to reduce the viscosity of the emulsion; (ii) coating the heated emulsion onto the substrate; and (iii) lowering the temperature of the coated emulsion to change the state of the coated emulsion from a liquid to a gel state, thereby forming a coating characterized by a corresponding increased-viscosity state. Suitably, the emulsion is heated within a temperature range of between 20 and 50° C. prior to coating and is lowered to be in the range of 5 and 20° C. after coating.

In the preferred embodiment, immediately after the emulsion is coated on a substrate, the emulsion temperature is rapidly lowered from about 40° C. to about 10° C. in a chilling section. The lowering of emulsion temperature changes the state of the coated emulsion from a liquid to a semi-solid gel. The chilling of the emulsion permits, in the preferred embodiment, the emulsion to travel through a series of warm air impingement dryers with no disruption to the coating. The chilling of the emulsion also allows the emulsion and substrate to travel over a series of rollers as it conveys through the machine. In a preferred commercial embodiment, the substrate to be coated is in the form of a moving web. The speed of the moving web is a function of the length of the chill box and the length of the dryer. The high polymeric content of the coated material permits the dried and coated web to be wound on a roll. Thus, in a commercial operation, the coated substrate can be passed over rollers during the drying process, and once dried, wound on cores. After completing the manufacture of a coated liquid-crystal sheet material between spaced electrodes, the sheet material can be cut into a plurality of smaller, individual areas for use in various display or other applications.

During the drying operation, as water evaporates, the coated emulsion thickness reduces in size. The concentration of gelatin polymer in the emulsion is limited to viscosity ranges that can be wet coated onto second conductors 22. Typically, the gelatin concentration is between 2 and 15 weight percent based on the weight of the emulsion, preferably less than 10 percent to be slot coated. The gelatin concentration must also be high enough that the chilled emulsion has enough hardness in the chilled state to be dried by air impingement and not be affected by contact with rollers. In practice the gelatin concentration must be greater than 2 percent to chill set, preferably less than 15%, preferably about 3 to 10%. Liquid crystal concentration relative to gel concentration improves reflectance per weight laydown of cholesteric material as liquid crystal concentration goes up relative to gelatin concentration. However, the mechanical strength of the polymer dispersed cholesteric layer goes down as the amount of polymer is reduced. Useful liquid crystal to gelatin ratios should be between 6:1 and 0.5:1 liquid crystal to gelatin, preferably 8:5. For pressure insensitive compositions, the ratio of liquid crystal to gelatin, by weight percent, is preferably less than 5 to 1, more preferably less than 4 to 1, most preferably less than 3 to 1, optimally less than 2 to 1. It is difficult to rapidly chill set and dry compositions having a ratio greater than 3:1. The use of hardener improves coating pressure insensitivity.

As water evaporates during drying, the coated emulsion thickness decreases. Within the usable concentration ranges, water removed during drying is significant, typically between 80 and 95 percent. The water loss reduces the height of wet-coated polymer dispersed cholesteric layer 30 for a given width. The wet to dry thickness ratio is typically a factor of between 3:1 and 10:1. Suitably, the wet coating is 10 to 150 microns when first coated and 2 to 20 microns when dried.

The resulting domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating.

Many conventional hardeners are known to crosslink gelatin. Gelatin crosslinking agents (i.e., the hardener) are included in an amount of at least about 0.01 wt. % and preferably from about 0.1 to about 10 wt. % based on the weight of hydrophilic colloid, and more preferably in the amount of from about 1 to about 5 percent by weight. More than one gelatin crosslinking agent can be used if desired.

Inorganic hardeners include compounds such as aluminum salts, especially the sulfate, potassium and ammonium alums, ammonium zirconium carbonate, chromium salts such as chromium sulfate and chromium alum, and salts of titanium dioxide, zirconium dioxide, and the like.

Representative organic hardeners or gelatin crosslinking agents useful in the present invention are illustrated, but not limited, by the following structures:

I. Aldehyde and Related Compounds:

II. Pyridiniums:

-continued wherein $X = BF_4^-$, $CF_3SO_3^-$, $PF6^-$, Halide.

III. Olefins:

IV. Carbodiimides:

V. Epoxides:

wherein linking groups $L^1$ and $L^2$ are each independently a single bond, a carbon atom, an oxygen atom, a sulfur atom, a carbonyl group a carboxylic ester group a carboxylic amide group a sulfonyl group a sulfonamide group an ethyleneoxy group, a polyethyleneoxy group, or an amino group wherein substituents X, Y, and Z are each independently a hydrogen atom or an alkyl group of 1–4 carbon atoms; and wherein $R^1$ and $R^2$ are each independently a hydrogen atom, a substituted or unsubstituted, linear or branched, saturated or unsaturated alkyl group of 1 to 10 carbon atoms (such as methyl, ethyl, n-propyl, isopropyl, t-butyl, hexyl, decyl, benzyl, methoxymethyl, hydroxyethyl, iso-butyl, and n-butyl), a substituted or unsubstituted aryl group of 6 to 14 carbon atoms (such as phenyl, naphthyl, anthryl, tolyl, xylyl, 3-methoxyphenyl, 4-chlorophenyl, 4-carbomethoxyphenyl and 4-cyanophenyl), a substituted or unsubstituted cycloalkyl group of 5 to 14 carbon atoms such as cyclopentyl, cyclohexyl, and cyclooctyl), a substituted or unsubstituted, saturated or unsaturated heterocyclic group (such as pyridyl, primidyl, morpholino, and furanyl), a cyano group, or a solubilizing group such as a carboxylic acid group, a sulfonic acid group, a phosphonic acid group, a hydroxamic acid group, a sulfonamide group, and a hydroxy group (and their corresponding salts). Examples of suitable substituents for $R^1$ and $R^2$ include one or more sulfonate groups, sulfate groups, carboxy groups, hydroxy groups, phosphonic acid groups, hydroxamic acid groups, amine groups, amide groups, ester groups, sulfonamide groups, nitro groups, cyano groups, oxo groups, and halogen atoms. Preferably, at least one of $R^1$ and $R^2$ is or contains a solubilizing group that becomes negatively charged when ionized, such as an acidic group. Examples of these solubilizing groups include, but are not limited to, carboxylic acid, sulfonic acid, phosphonic acid, hydroxamic acid, sulfonamide, and hydroxy groups (and their corresponding salts). One or more of $R^1$ and $R^2$ also may be, or may contain, a polyethylenoxy group. $R^1$ and $R^2$ may be joined by sufficient numbers of carbon, nitrogen, and sulfur atoms to form, independently, a five- or six-membered ring. When L is linked to a ring structure, it could be single or multiple substitutions.

More specific representative examples of hardening agents are represented by the following structures:

I. Aldehyde and Related Compounds:

Thus, suitable aldehyde hardeners include formaldehyde and compounds that contain two or more aldehyde functional groups such as glyoxal, gluteraldehyde and the like. Other preferred hardeners include compounds that contain blocked aldehyde functional groups such as aldehydes of the type tetrahydro-4-hydroxy-5-methyl-2 (1H)-pyrimidinone polymers (Sequa SUNREZ® 700), polymers of the type having a glyoxal polyol reaction product consisting of 1 anhydroglucose unit: 2 glyoxal units (SEQUAREZ® 755 obtained from Sequa Chemicals, Inc.), DME-Melamine non-formaldehyde resins such as Sequa CPD3046-76 obtained from Sequa Chemicals Inc., 2,3-dihydroxy-1,4-dioxane (DHD), and the like.

II. Pyridiniums:

III. Olefins:

Thus, hardeners that contain active olefinic functional groups include, for example, bis-(vinylsulfonyl)-methane (BVSM), bis-(vinylsulfonyl-methyl) ether (BVSME), 1,3,5-triacryloylhexahydro-s-triazine, and the like. In the context of the present invention, active olefinic compounds are defined as compounds having two or more olefinic bonds, especially unsubstituted vinyl groups, activated by adjacent electron withdrawing groups (The Theory of the Photographic Process, 4$^{th}$ Edition, T. H. James, 1977, Macmillan Publishing Co., page 82).

IV. Carbodiimides:

V. Epoxides:

VI. Triazines:

These compounds can be readily prepared using the published synthetic procedure or routine modifications that would be readily apparent to one skilled in the art of synthetic organic chemistry.

Olefinic hardeners are most preferred. As mentioned above, olefinic hardeners are compounds with active olefinic functionality, including divinyl ketone, resorcinol bis(vinylsulfonate) (U.S. Pat. No. 3,689,274), 4,6-bis(vinylsulfonyl)-m-xylene (U.S. Pat. No. 2,994,611), bis(vinylsulfonylalkyl) ethers and amines (U.S. Pat. Nos. 3,642,486 and 3,490,911), 1,3,5-tris(vinylsulfonyl) hexahydro-s-triazine, diacrylamide (U.S. Pat. No. 3,635,718), 1,3-bis(acryloyl)urea (U.S. Pat. No. 3,640,720), N,N'-bismaleimides (U.S. Pat. No. 2,992,109) bisisomaleimides (U.S. Pat. No. 3,232,763), bis(2-acetoxyethyl) ketone (U.S. Pat. No. 3,360,372), and 1,3,5-triacryloylhexahydro-s-triazine. Blocked active olefins of the type bis(2-acetoxyethyl) ketone and 3,8-dioxodecane-1,10-bis(pyridinium perchlorate) may also be used.

Among hardeners of the active olefin type, a preferred class of hardeners particularly are compounds comprising two or more vinyl sulfonyl groups. These compounds are hereinafter referred to as "vinyl sulfones." Compounds of this type are described in numerous patents including, for example, U.S. Pat. Nos. 3,490,911, 3,642,486, 3,841,872 and 4,171,976. Vinyl sulfone hardeners are believed to be effective as hardeners as a result of their ability to crosslink polymers making up the colloid.

A preferred class of vinyl sulfone hardeners for use in this invention are compounds of the formula:

wherein n is an integer with a value of 2 to 6 and Z is an organic linking group with a valence equal to n. Suitable examples of the organic linking group represented by Z include alkyl, alkylene, aryl, arylene, aralkyl and alkaryl groups. As a further example Z can be a heteroatom such as a nitrogen atom or an ether oxygen atom.

In the above formula Z is preferably

-A-3

-O-A-O-, or

-D- where A is an alkylene group containing 1 to 8 carbon atoms which may be unsubstituted or substituted and the alkylene chain may be interrupted by one or more hetero atoms or organic groups, or an arylene group, which may be substituted or unsubstituted, and D is a trivalent alkylene group, a trivalent arylene group which may be substituted with one or more additional $CH_2=CH-SO_2$-groups, a trivalent cyclic alkylene group which may be substituted with one or more $CH_2=CH-SO_2$-groups, or a trivalent heterocyclic group which may be substituted with one or more $CH_2=CH-SO_2$-groups. Preferred substituents for A include —OH, phenyl, aralkyl, such as phenethyl, or $CH_2=CH-SO_2$-groups. The aryl moiety of the aralkyl group may be sulfonated. The alkylene group may be interrupted by one or more of the following: oxygen atoms, arylene groups, cycloalkyl groups, —NHCONH—, or —N—R, where R is an alkyl group containing 1 to 8 carbon atoms.

A particularly preferred class of vinyl sulfone hardeners for use in this invention are bis(vinylsulfonyl)alkane hardeners of the formula:

where x is an integer with a value of from 1 to 3.

A preferred vinyl sulfone hardener for use in this invention is bis(vinylsulfonyl)methane (BVSM) which has the formula:

Another preferred vinyl sulfone hardener for use in this invention is bis(vinylsulfonylmethyl)ether (BVSME) which has the formula:

Specific examples of other vinyl sulfone hardening agents that are useful in this invention include the following:

Vinyl sulfone hardeners, particularly the more active ones, such as bis-(vinylsulfonyl)methane (BVSM), are subject to homopolymerization which can occur before the hardeners are associated with the gelatin and it can occur as a competing reaction after association. The problem of homopolymerization of vinyl sulfones used in compositions for hardening of photographic gelatin can be avoided by the use of inhibitors. Thus, for example, D. M. Burness et al in U.S. Pat. No. 4,171,976, issued Oct. 23, 1979, describes the use of certain inhibitors such as 3,5-dinitrobenzoic acid to prevent or minimize homopolymerization of bis(vinylsulfonyl)-alkane hardeners. Similarly, Burness et al U.S. Pat. No. 3,841,872, issued Oct. 15, 1974, utilizes hydroquinone as a stabilizer in the preparation of bis(vinylsulfonyl)alkane hardeners.

The vinyl sulfone hardeners described herein can be used in any effective amount in hardening gelatin. Suitable amounts are typically in the range of from about 0.5 to about 10 percent by weight, based on the weight of hydrophilic colloid, and more preferably in the amount of from about 1 to about 5 percent by weight.

Vinyl sulfones are usually prepared from the corresponding haloethylsulfonyl compounds by dehydrohalogenation using a strong organic base such as triethylamine. One of the problems involved in synthesizing such compounds, particularly the more active ones, such as BVSM, is that they tend to homopolymerize in the presence of the strong base. This problem can be alleviated by combining the citric stabilizer with the haloethylsulfonyl precursor compound. In this way, the citric stabilizer is associated with the vinyl sulfone hardener from its inception.

Other examples of hardening agents can be found in standard references such as *The Theory of the Photographic Process,* T. H. James, Macmillan Publishing Co., Inc. (New York 1977) or in *Research Disclosure,* September 1996, Vol. 389, Part IIB (Hardeners) or in *Research Disclosure,* September 1994, Vol. 365, Item 36544, Part IIB (Hardeners). Research Disclosure is published by Kenneth Mason Publications, Ltd., Dudley House, 12 North St., Emsworth, Hampshire P010 7DQ, England. As indicated above, both inorganic and organic hardeners are known and can be used in the present invention. Organic hardening agents are preferred over inorganic hardeners.

Selection of a hardening agent is dependent on cost and efficacy. It is important that the hardener selected have a low ionic content and be used sparingly. Coating associated with the manufacture of photographic film have found that vinyl sulfone hardeners, particularly the more active ones, such as bis-(vinylsulfonyl)methane (BVSM), are useful as low-cost efficient material to cross link gelatin. Using such materials in display manufacture provides a low-cost efficient material.

Continuing the description of FIG. 1, second conductors 22 overlay polymer dispersed cholesteric layer 30. Second conductors 22 should have sufficient conductivity to carry a field across polymer dispersed cholesteric layer 30. Second conductors 22 can be formed in a vacuum environment using materials such as aluminum, tin, silver, platinum, carbon, tungsten, molybdenum, tin or indium or combinations thereof. The second conductors 22 are as shown in the form of a deposited layer. Oxides of said metals could be used to darken second conductors 22. The metal material can be excited by energy from resistance heating, cathodic arc, electron beam, sputtering, or magnetron excitation. Tin-oxide or indium-tin oxide coatings permit second conductors 22 to be transparent to operate in conjunction with opaque first conductors 20.

In a preferred embodiment, second conductors 22 are printed conductive ink such as ELECTRODAG 423SS screen printable electrical conductive material from Acheson Corporation. Such printed materials are finely divided graphite particles in a thermoplastic resin. The second conductors 22 are formed using printed inks to reduce cost display. The use of a flexible support for substrate 15, layer laser etched first conductors 20, machine coating polymer dispersed cholesteric layer 30, and printing second conductors 22 permit the fabrication of very low cost memory displays. Small displays formed using these methods can be used as electronically rewritable transaction cards for inexpensive, limited rewrite applications. See, for example, commonly assigned, copending application Ser. No. 10/0885,851 filed Feb. 28, 2002, hereby incorporated by reference in its entirety.

Figure 2:
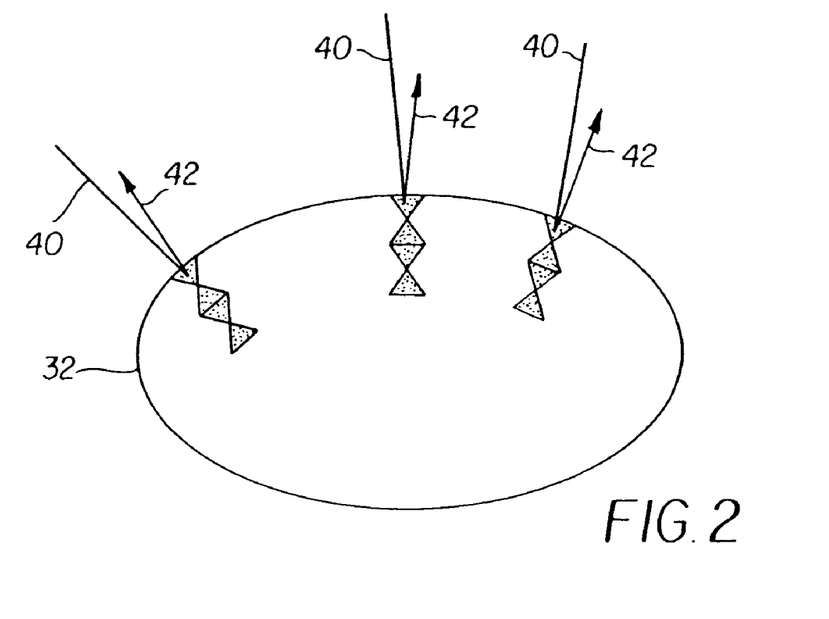
FIG. 2 is a sectional view through a cholesteric liquid crystal domain.

FIG. 2 is a cross section through a domain 32 containing a cholesteric material. Domain 32 is spherical, and cholesteric material anchors on the surface of the domain 32. Because the surface of domain 32 is spherical, incident light 40 from any angle of observation can be reflected back as reflected light 42 when sheet 10 is viewed off-axis. The result is that these polymer dispersed (cholesteric) liquid crystals (PDLC) have good off-axis reflectivity.

Figure 3A:
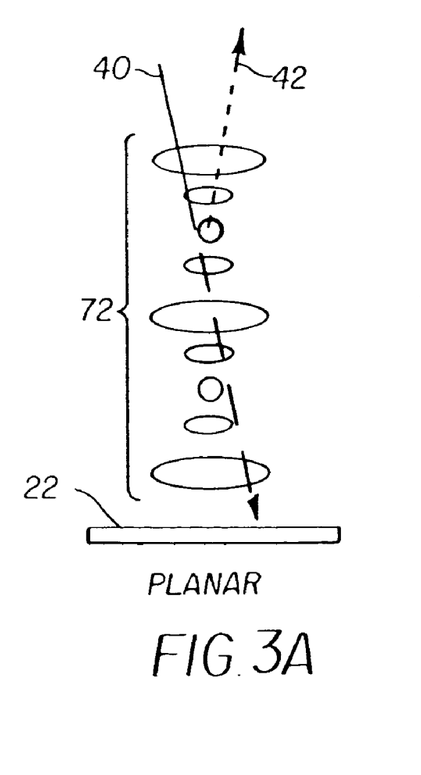
FIG. 3A is a schematic sectional view of a chiral nematic material in a planar state reflecting light.
Figure 3B:
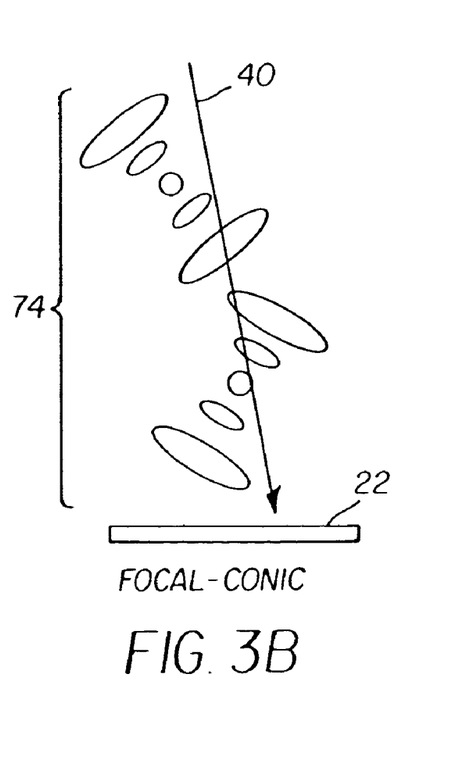
FIG. 3B is a schematic sectional view of a chiral nematic material in a focal conic state transmitting light.

FIG. 3A and FIG. 3B show two stable states of cholesteric liquid crystals. In FIG. 2A, a relatively high voltage field has been applied and quickly switched to zero potential, which causes the liquid crystal molecules to become planar liquid crystals 72. In FIG. 3B, application of a lower voltage field has caused molecules of the chiral nematic material to break into transparent tilted cells that are known as focal conic liquid crystals 74. Increasing the time duration of a relatively low-voltage pulse progressively molecular orientation from planar state 72 to a fully evolved and transparent focal conic state 74. A typical voltages is about 10 volts/micron of coated material, wherein not more than about 100 volts is necessary to achieve the planar state.

A light absorbing second conductor 22 is positioned on the side opposing the incident light 40. In the fully evolved focal-conic state the cholesteric liquid crystal is transparent, passing incident light 40, which is absorbed by second conductor 22 to provide a black image. Progressive evolution to the focal-conic state causes a viewer to see an initial bright reflected light 40 that transitions to black as the cholesteric material changes from planar state 72 to a fully evolved focal-conic state 74. The transition to the light transmitting state is progressive, and varying the low voltage time permits variable levels of reflection. These variable levels can be mapped out to corresponding gray levels, and when the field is removed, light modulating layer 11 maintains a given optical state indefinitely. The states are more fully discussed in U.S. Pat. No. 5,437,811.

It is preferable to generate a polymer dispersed cholesteric layer using a photographic agent which has low cost, high volume utilization and proven efficacy. An experiment was performed to determine if such material, more exactly BVSM would effectively cross-link the gelatin binder and permit operation of the cholesteric material.

Another aspect of the present invention relates to a display sheet comprising a substrate, an electrically conductive layer formed over the substrate, and a liquid-crystal-containing imaging layer comprising a chiral nematic material formed by the above described methods disposed over the electrically conductive layer.

EXAMPLE

An experiment was performed to examine the effects of various levels of gelatin hardener added on a cholesteric liquid-crystal dispersed as spaced domains in a gelatin matrix. Rectangular samples of film displays on a polyester substrate with ITO (indium tin oxide), a gelatin sub-layer, an imaging layer comprising liquid crystal domains dispersed in gelatin, and a nanopigment-in-gelatin layer were coated on a pilot coating machine and prepared with screen printed graphitic ink (Acheson 423SS) patches.

The gelatin sub layer was prepared as follows. An emulsion was provided with 2% gelatin by weight with a surfactant added to it for coating purposes. The nanopigment in gelatin layer was prepared as follows. An emulsion was provided with 4% gelatin by weight with four-inkjet pigment mixed together to make a black layer. These layers were consistent across Samples A, B, C, and D.

The polymer-dispersed liquid-crystal material was prepared as follows. An emulsion was provided with cholesteric oil domains with a mean diameter of 10 microns dispersed and comprising 12.8% weight percent and 8% gelatin solution. A solution comprised of distilled water and the hardener BVSM was then combined with the emulsion stated above using a static mixer together such that the diluted emulsion comprised of 8% weight percent liquid crystal dispersion and 5% gelatin solution. Three levels of BVSM hardener were examined: 1.75%, 2.35%, and 3% based on gelatin weight. Samples B, C, and D were coated with a polymer-dispersed liquid-crystal material that had, respectively 1.75%, 2.35%, and 3% if BVSM based on gelatin weight. In addition, a Comparative Sample A was coated that had no hardener added to it.

In the case of the gelatin sub layer, the emulsion was heated to 40° C., which reduced the viscosity of the emulsion to 2 Centipoises. This layer was coated using a hopper. In the case of the polymer dispersed liquid crystal emulsion, it was heated to 40° C., which reduced the viscosity of the emulsion to 7 Centipoises. In the case of the nanopigment layer, the emulsion was heated to 40° C., which reduced the viscosity of the emulsion to approximately 60 Centipoises. The polymer dispersed liquid crystal layer and the nanopigment in gelatin layer are coated simultaneously using a slide hopper.

A 125-micron polyester substrate 15 having an ITO conductive layer was continuously coated with the heated gelatin sub emulsion at 2.5 cc per square foot on a film-coating machine. After the roll is coated, dried, and wound up, the heated polymer dispersed liquid crystal emulsion is coated at 5.7 cc per square foot and the heated nanopigment in gelatin layer in coated at 1 cc per square foot. The polymer dispersed liquid crystal and the nanopigment in gelatin layers are coated simultaneously. The machine speed was set so that the emulsion temperature was reduced to 10 degrees centigrade in a first chill section of the machine. The viscosity of the emulsion increased so that the coating viscosity changed from a liquid state to a very high-viscosity gel state. The emulsion chill-set hard enough to allow both warm impingement air and the ability to be passed over roller sets in drying areas of the film coating equipment to remove the bulk of the water content of the emulsion. The resulting coating was about 10 microns thick and had a gelatin layer, with stacked layers of flattened domains of cholesteric liquid crystal dispersed in a gelatin polymeric matrix on top of it, and the nanopigment in gelatin layer on top of that. After the pilot coating machine was completed, the graphitic ink was screen printed on top of the dried film at a thickness of approximately 18 microns.

After the different samples were completed, the resulting samples were placed subjected to various environmental conditions to test the impact of adding hardener to the coated sample.

Prior to placing the samples in the environmental conditions, the color spectrum was measured using a Perkin Elmer UV/Visible Spectrometer, Lambda® 12. The color space (LABR) was measured using an X-Rite 938 Spectrodensitometer®. The coated samples were then placed into environmental conditions of 49° C. and 95% RH for 24 hours.

After 24 hours, the wavelength spectrum of the samples was again tested using the Lambda 12 Spectrometer and the color space was measured using the X-Rite 938 Spectrodensitometer. The test is LAB $D^{50}{}_2$. All the data was taken on a black background. The following results in Table 1 were obtained.

TABLE 1

| Sample | Prior to Exposure | | | After Exposure At 49° C. and 95% RH for 24 hrs | | | Change | | |
|---|---|---|---|---|---|---|---|---|---|
| | L* | a* | b* | L* | a* | b* | $\Delta E^*_{ab}$ | $\Delta H^*_{ab}$ | $\Delta L^*_{ab}$ |
| COMP A | 43.61 | −30.54 | 7.91 | 36.06 | −37.83 | −11.89 | 22.41 | 21.10 | 7.55 |
| B | 44.75 | −32.64 | 10.97 | 39.31 | −36.01 | −6.26 | 18.38 | 17.56 | 5.44 |
| C | 45.04 | −31.55 | 9.18 | 38.05 | −36.48 | −11.26 | 22.16 | 21.03 | 6.99 |
| D | 44.49 | −31.73 | 9.78 | 36.39 | −34.73 | −15.22 | 26.45 | 25.18 | 8.10 |

The results are based on the CIELAB color space. The a* value shows the redness or greenness of the color space and the b* shows the yellowness of blueness of the color space. The greenness and blueness are shown with a negative sign. The L* is the lightness of the color spectrum.

In the above table, the formula $\Delta E^{*ab}=[(\Delta a^*)^2+[(\Delta b^*)^2+[(\Delta L^*)^2]^{1/2}$ gives the distance between two points in the color space.

The formula $\Delta H^*_{ab}=[(\Delta a^*)^2+(\Delta b^*)^2]^{1/2}$ gives the hue difference between two points in the color space.

The formula $\Delta L^*_{ab}=[L_a-L_b]$ gives the light difference between two points in the color space.

Using a software analysis tool, the results obtained in Table 1 indicate that the addition of hardener is beneficial for hue stability at elevated temperature and humidity. The original hue of the samples were green and, without hardening agent, in Comparative Sample A, the display when in the planar state was more bluish after being exposed to the environmental conditions of the test. The bluish color change is reflected in the change in the b* data. Sample D shows that there is optimal concentration for the amount of hardening agent above which improvement is no longer obtained under these test conditions. The optimal concentration for maintaining hue stability depends on the particular hardening agent selected.

In another test, the coated samples were electrically driven over environmental conditions ranging from 8 to 40° C. to test the addition of hardener. It was found that Samples with hardener were statistically superior for maintaining visible contrast when compared to Comparative Sample A without the addition of hardener. The contrast is the ratio of the % reflectivity of the display in the focal conic state to the planar state. Good contrast was achieved with all samples. However, the contrast for Samples B, C, and D with hardener was measurably better than the contrast for Comparative Sample A with the best contrast achieved by Sample D having the 3% hardener level. Comparative Sample A had the same percent reflectance for the planar state but a slightly higher value for the focal conic state, whereas a lower value for the percent reflectance in the focal conic is desired. The film samples with the BVSM hardener provided a lower value for the percent reflectance in the focal conic.

The invention has been described in detail with particular reference to certain preferred embodiments thereof, but it will be understood that variations and modifications can be effected within the spirit and scope of the invention.

PARTS LIST 10 sheet
15 substrate
20 first conductor
22 second conductor
30 polymer dispersed cholesteric layer
32 domains
40 incident light
42 reflected light
60 Cholesteric liquid crystal
62 encapsulation material
64 solution
72 planar liquid crystal
74 focal conic liquid crystal

What is claimed is:

1. A method of making a sheet, comprising polymer-dispersed cholesteric liquid crystals, comprising the steps of:
    (a) providing an emulsion comprising cholesteric liquid-crystal dispersed in a solution comprising gelatin and an hardening agent for the gelatin of at least 0.1 weight percent based on the gelatin dry weight
    (b) coating said emulsion over a substrate; and
    (c) drying said emulsion to form at least one electro-optical imaging layer comprising polymer-dispersed liquid crystal domains dispersed in a matrix comprising hardened gelatin.

2. The method of claim 1 wherein said electro-optical imaging layer is open at the sides of the sheet.

3. The method of claim 1 wherein the substrate comprises a polyester material.

4. The method of claim 1 wherein the coating is dried to a thickness of less than 15 micrometers.

5. The method of claim 1 wherein the hardening agent is selected from the group consisting of organic compounds with aldehyde functional groups, blocked aldehyde functional groups, and active olefinic functional groups; inorganic compounds; and combinations thereof.

6. The method of claim 5 wherein the hardening agent is an organic compound selected from active olefins.

7. The method of claim 1 wherein said hardening agent comprises a vinyl sulfone compound.

8. The method of claim 7, wherein said vinyl sulfone hardening agent is represented by the formula:
$(H_2C=CH-SO_2)_n$-Z wherein n is an integer with a value of 2 to 6 and Z is an organic linking group with a valence equal to n.

9. The method of claim 8 wherein Z is a heteroatom or an alkyl, alkylene, aryl, arylene, aralkyl or alkaryl group.

10. The method of claim 7 wherein said vinyl sulfone hardening agent is represented by the formula: $CH_2=CH-SO_2-(CH_2)_x-SO_2-CH=CH_2$ wherein x is an integer with a value of from 1 to 3.

11. The method of claim 10, wherein said vinyl sulfone hardening agent is bis(vinylsulfonyl)methane or bis(vinylsulfonylmethyl)ether.

12. The method of claim 1 wherein the emulsion in (a) s formed by combining a first stream of an aqueous solution comprising the hardening agent with a second stream of an emulsion comprising the cholesteric liquid crystal dispersed in a solution comprising said gelatin.

13. The method of claim 12 wherein the streams are subsequently flowed through means for forming a homogenous mixture of the combined contents of the streams.

14. The method of claim 13 wherein said means is a static mixer.

15. The method of claim 12 wherein the two streams are mixed together and coated before the crosslinking of the gelatin by the hardening agent is substantially completed.

16. The method of claim 1 wherein coating step (b) comprises
(i) heating the emulsion to reduce the viscosity of the emulsion;
(ii) coating the heated emulsion onto the substrate;
(iii) lowering the temperature of the coated emulsion to change the state of the coated emulsion from a liquid to a gel state, thereby forming a coating characterized by a corresponding increased-viscosity state.

17. The method of claim 1 wherein step (c) comprises drying the coating, while maintaining it in the increased viscosity state, to form a coating in which domains of cholesteric liquid crystals are dispersed in a dried gelatin-containing matrix.

18. The method of claim 1 wherein the emulsion in (a) includes a surfactant and a biocide.

19. The method of claim 1 wherein the emulsion in step (b) is heated within a temperature range of between 20 and 50° C. prior to coating.

20. The method of claim 16 wherein in step (iii) the temperature of the emulsion is lowered to be in the range of 5 and 20° C. after coating.

21. The method of claim 1 wherein the gelatin concentration in the emulsion when coated is between 2 and 15 weight percent based on the weight of the emulsion.

22. The method of claim 1 wherein the ratio of liquid crystal to gelatin in the emulsion is between 6:1 and 0.5:1.

23. The method of claim 1 wherein between 80 and 95 percent by weight of water in the emulsion is removed from the coated emulsion during drying in step (c) and wherein the wet to dry thickness ratio is between 3:1 and 10:1.

24. The method of claim 1 wherein the domains in the dried coating of step (c) has an average diameter of 2 to 30 microns.

25. The method of claim 1 wherein the emulsion is coated over patterned ITO conductors in step (b).

26. The method of claim 1 wherein the wet coating is 10 to 150 microns when first coated and 2 to 20 microns when dried.

27. The method of claim 1 wherein, after step (c), second conductors are formed, using printed inks, over the dried coating.

* * * * *